United States Patent
Price

[11] Patent Number: 5,148,469
[45] Date of Patent: Sep. 15, 1992

[54] DIRECT PAGER ACCESS WITH FULL NUMBER DIALING

[75] Inventor: Gary A. Price, Beaverton, Oreg.

[73] Assignees: Seiko Corp.; Seiko Epson Corp., both of Japan

[21] Appl. No.: 549,212

[22] Filed: Jul. 5, 1990

[51] Int. Cl.[5] .............................................. H04M 11/00
[52] U.S. Cl. ........................................ 379/57; 379/67; 379/201
[58] Field of Search ................. 379/233, 207, 221, 56, 379/57, 63, 201, 67; 340/825.44, 311.1

[56] References Cited

U.S. PATENT DOCUMENTS 4,713,808  12/1987  Gaskill et al. ................. 340/825.44

FOREIGN PATENT DOCUMENTS 2622378  4/1989  France .................................. 379/57

OTHER PUBLICATIONS

Synetellect Inc. products brochure for Sceptre TM.

Gordon Kapes Inc., *Technical Practice*, Issue 1, Mar., 1988.

*Primary Examiner*—James L. Dwyer
*Assistant Examiner*—Dwayne D. Bost
*Attorney, Agent, or Firm*—Elmer Galbi

[57] ABSTRACT

A paging system and method utilize a trunk interface module which is capable of recognizing unique identification numbers, which comprise the telephone number which a caller dials to reach a particular paging receiver. The relative-digit-independent truck interface module is located between the telephone company central switch and the computer in the central clearing house and is capable of recognizing and relaying a set of at least seven digits, which comprise the unique receiver's identification number, wherein the values of the digit and the identification number are completely random, i.e., the digits are not necessarily representative of telephone numbers/identification numbers, in a particular telephone exchange. The system also includes a separate inward dialing portion which does not use the interface module and which requires the manual entry of receiver identification numbers.

8 Claims, 2 Drawing Sheets

DIRECT PAGER ACCESS WITH FULL NUMBER DIALING

RELATED APPLICATIONS AND PATENTS

The present application is related to U.S. Pat. No. 4,713,808, granted Dec. 15, 1987, to Gaskill et al., for WATCH PAGER SYSTEM AND COMMUNICATION PROTOCOL. That patent and this case are assigned to the present assignee. The '808 patent is incorporated herein by reference.

FIELD OF THE INVENTION

The present invention relates to paging systems, and more particularly to a paging system wherein the receiver has a unique identification number, containing at least seven random digits therein, and wherein the receiver may receive messages from a number of geographically separated clearinghouse/transmitter systems.

BACKGROUND OF THE INVENTION

In the conventional paging system, each pager is assigned an identification number. In order for a caller to reach a particular pager, the caller dials a preassigned telephone number, which call is processed by a telephone company central switch, which in turn connects to the paging system clearinghouse. The central switch may be connected to the apparatus at the paging system by conventional lines or by telephone trunks. In either situation, the number of "lines", and hence, the number of pagers that may be served by the system is limited to the number of digits which may be processed by the central switch and the paging system. In the case of direct lines, the usual telephone number may be used as the unique identification number for the receiver. The drawback with the direct line system is the significant expense of dedicated lines and the limited number of dedicated lines which may economically be used between the central switch and the paging system clearinghouse/transmitter.

Another form of paging system uses trunk lines which do not technically have their own number, but which may transmit a collection of dedicated identification numbers, so long as the numbers are part of the same telephone exchange. Certainly, the use of trunk lines is preferable as trunk lines are considerably less expensive than dedicated lines and trunk lines can handle a greater number of calls.

In the case of a paging receiver which has more than four or five digits in its unique identification number, the use of trunk lines with direct inward dialing is not feasible, as known systems only allow transmission of up to five digits of a telephone/identification number, thereby effectively limiting the number of receivers in any one system to 100,000. In the case of a large metropolitan network, such limitation renders a system virtually useless. Certainly in the case of a system such as the one described in the Gaskill et al. reference, above, wherein nationwide, and possibly world-wide transmission to a particular receiver is possible, the limitation of a five digit identification number is unacceptable.

In the system described in Gaskill et al., a person (the caller) desiring to send a message to a particular receiver dials a telephone number, which may be either direct inward dialing on a trunk or have a dedicated line, and is connected with a central clearing house. Instructions are provided to the caller, by means of a voice response unit (VRU), which instructs the caller to dial the unique identification number for the particular receiver and, once the validity of the identification number is confirmed, instructions are provided to enable the caller to send a particular message. It is apparent that the caller must, in reality, dial two numbers instead of one, as is proposed in the instant invention.

Trunk interface modules are known in the art. One such module is the unit marketed by Syntellect Inc., under the Sceptre TM, or the System 640 DID To Loop Start Interface manufactured by Gordon Kapes Inc. The specification and designs of such a system are described in the technical practice, issue Mar. 1, 1988 by Gordon Kapes Inc., which is incorporated herein by reference. Neither of the above described systems, however, provide any capability for passing a full seven digit telephone num therethrough to provide the number information to system components on the downstream side of the interface module.

SUMMARY OF THE INVENTION

The invention disclosed herein is a paging system and method which uses a relative-digit-independent trunk interface module, which is capable of recognizing unique identification numbers, which comprise the telephone number which a caller dials to reach a particular paging receiver. The relative-digit-independent truck interface module is located between the telephone company central switch and a computer in the central clearing house and is capable of recognizing and relaying a set of at least seven digits. A particular receiver can be reached from anyone of a plurality of central clearing houses. One of the clearing houses may have the trunk interface module described above so that through that clearinghouse a particular receiver may be reached by dialing a DID number the last seven digits of which correspond to the receiver's ID number. The same receiver can be reached through other clearinghouses by dialing the number of the clearinghouse and by then dialing the receiver's ID number. A system subscriber is provided with a special telephone number which will allow access to the system and require the entry of an identification code prior to the subscriber making special requests, such as retransmission of messages or requesting entry of message codes.

Additional objects and advantages of the invention will be more fully apparent as the description which follows is read in conjunction with the drawings.

DETAILED DESCRIPTION OF THE PREFERRED EMBODIMENT

Figure 1:
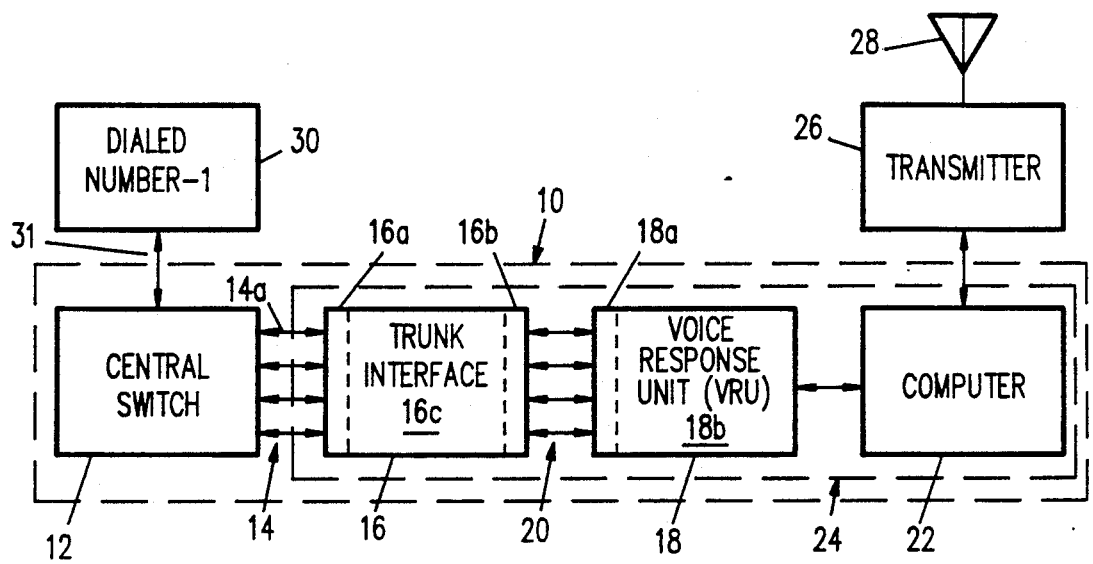
FIG. 1 is a block diagram of system components involved in transmitting a signal to a receiver, as used by a caller.

Turning now to the drawings, and initially to FIG. 1, what are referred to herein as transmitting components of the paging system of the invention are depicted generally at 10. Transmitting components 10 include a telephone company central switch 12. Central switch 12 is connected to a number of direct inward dialing (DID) trunk lines, shown generally at 14. Trunk lines 14 connect to a trunk interface module 16, which is in turn, connected to a voice response unit (VRU) 18 by a number of system lines which are shown generally at 20. Voice response unit 18 is connected to a computer 22 which stores paging system information.

As depicted in FIG. 1, interface module 16, voice response unit 18 and computer 22 are located in a central clearinghouse 24. Signals to individual pagers are directed from computer 22 to a transmitter 26 and are broadcast over an antenna 28. The paging system is initially activated when a first number is dialed by a caller on a telephone, represented by block 30, and connections are made to central switch 12 over a general purpose telephone line 31. The operation of transmitting components 10 will be described in greater detail later herein. The steps required by a subscriber to place special requests will be described later herein.

Figure 2:
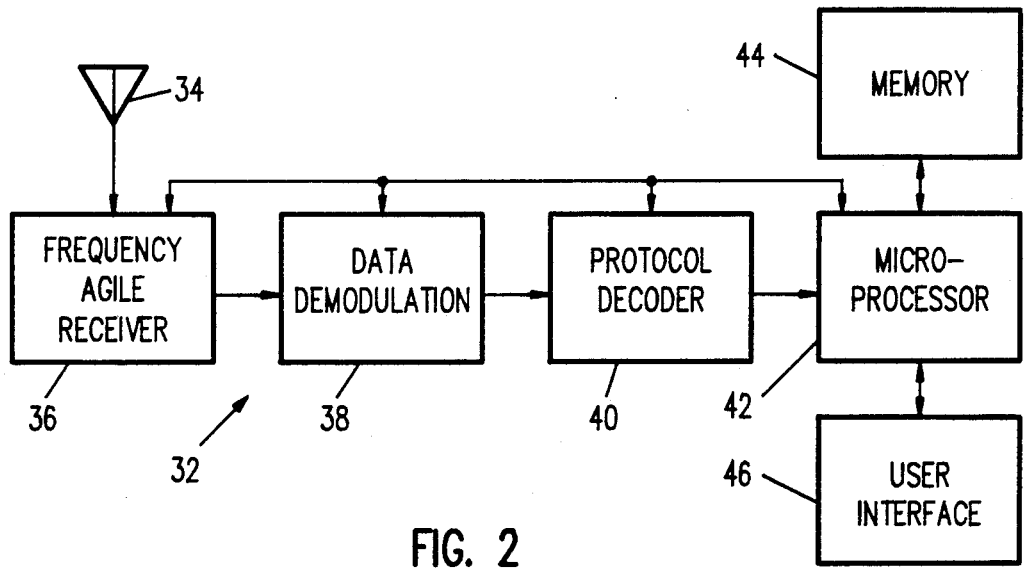
FIG. 2 is a block diagram of a pager receiver of the invention.

Turning now to FIG. 2, a brief description of a pager receiver 32, which may take the form of a wrist watch, described in greater detail in U.S. Pat. No. 4,713,808, issued Dec. 15, 1987, to Gaskill et al., and which is incorporated herein by reference, follows.

Receiver 32 includes an antenna 34, a frequency agile receiver 36, a data demodulator 38, a protocol decoder 40 and a microprocessor 42. Microprocessor 42 is connected to a memory unit 44 and to a user interface 46 which provides the pager-carrying individual (the user) with paging information, as well as, in the case of a wrist watch receiver, day, date, time and message information.

Referring back to FIG. 1, when a caller dials a number, in order to send a message to a subscriber's receiver, block 30, central switch 12 directs the number to a particular DID trunk line, such as 14a. The dialed number is typically passed as a pulse-dial signal from central switch 12. As previously noted, without the provision of trunk interface module 16, connection is made through voice response unit 18, which will "answer" the call coming into it over a DID trunk.

Without trunk interface module 16, VRU 18 provides a voice instruction (prompt) to the caller to enter the identification number of a particular paging receiver. Once the caller enters the identification number VRU 18 passes that information to computer 22 which compares the identification number to those numbers in the user database.

If the identification number is valid, computer 22 provides a signal to VRU 18, which acts as a secondary switch, and opens direct communication between central switch 12 and computer 22. As previously noted, this operation is necessary because with the usual central switch information, even with the presence of a conventional trunk interface module, there is no way to pass the information entered by the caller, which is the full seven-plus digit telephone number, through central switch 12 to computer 22.

The trunk interface module includes input ports 16a, which are connected to DID trunk lines 14, output ports 16b, which are connected to lines 20, and message recognition means 16c, which is constructed to recognize and pass the full seven-plus digit called number to VRU 18 and computer 22. This operation allows computer 22 to validate the received called number as a receiver identification number, which contains at least seven digits, each of which may be completely random with respect to the other digits in the identification number. The trunk interface module is therefor relative-digit independent, as it will recognize and relay a set of at least seven independent digits to computer 22. Message recognition means is operable, when a DID line 14 is activated, to capture the seven digit dialed number from the central switch. Module 16 further includes means for activating an output port 16b when a signal is received from the central switch. Such means also generate a dual-tone, multifrequency (DTMF) signal, which is representative of the called number.

VRU 18 includes plural input ports 18a, a first plurality of which are connected, in this portion of the system, to the output ports 16b of trunk interface module 16 over lines 20. VRU 18 also includes receiver means 18b which is activated when an input port is activated, which generates a series of voice prompts, and which accepts a series of DTMF signals from module 16, which signals are representative of commands.

Validation of the called/identification number by computer 22 is a triggering event which opens communication between the central clearinghouse and the caller.

Figure 3:
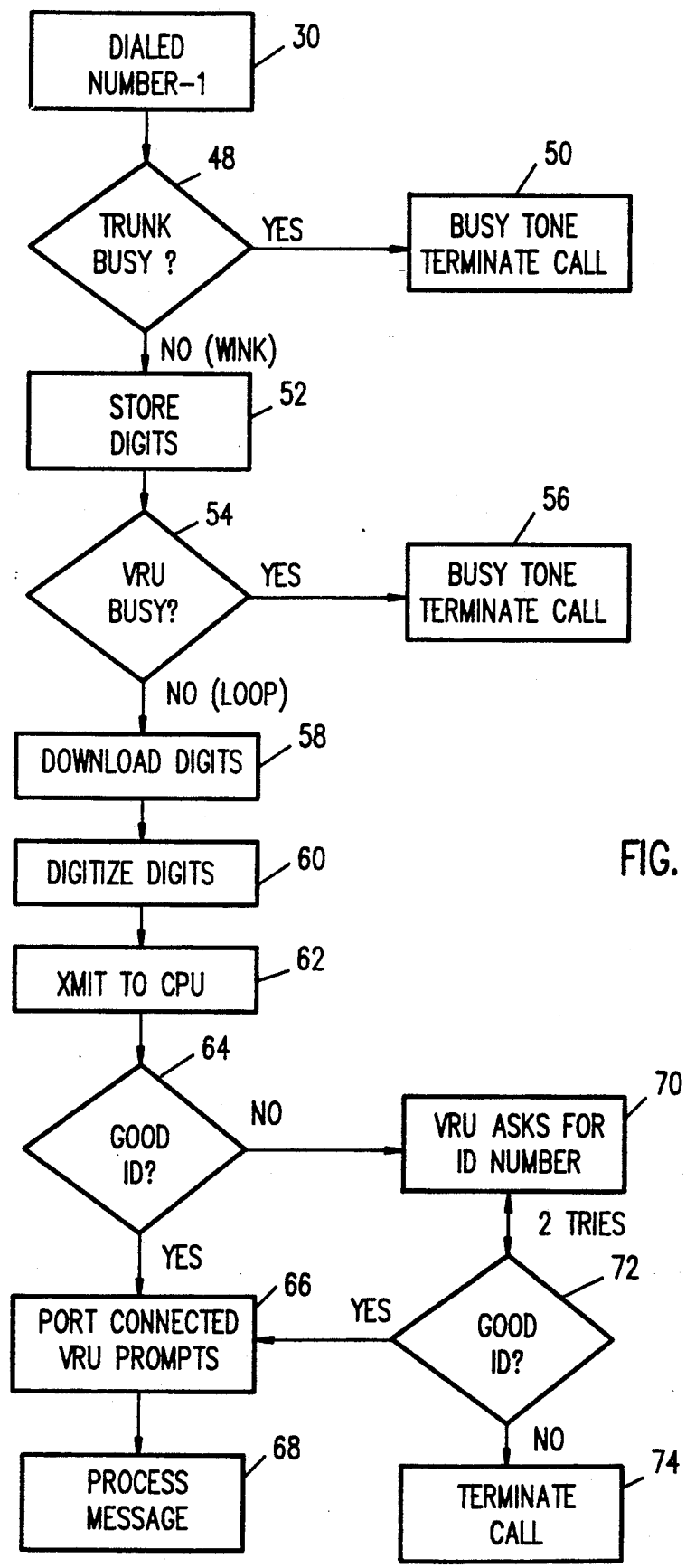
FIG. 3 is a flow chart representing the steps required for a caller to gain entry to the message system.

Referring now to FIGS. 1 and 3, during system operation, a caller dials a number, such as Dialed Number-1, block 30, which reaches central switch 12, block 48. The central switch directs the call to a trunk line, such as line 14a. If the trunk is busy, a busy tone is generated and the call is terminated, block 50.

If the trunk is not busy, the call proceeds as far as trunk interface module 16, which acts as a direct inward dialing terminal device with respect to central switch 12 and operates as a standard loop start trunk to VRU 18 and computer 22. As central switch 12 seizes a DID trunk, such as 14a, trunk interface module 16 will send a "wink" signal to central switch 12 that the connection has been made.

At this point, it is important to appreciate the difference between a DID trunk and a central office loop or ground start trunk. Both a loop start trunk and a DID trunk physically consists of a pair of wires which are generally called "tip" and "ring". All of the signals between the central switch and terminal equipment in this case, the central clearinghouse 24, are carried on these two wires. A loop start trunk is used for incoming and outgoing calls while a DID trunk is used only for incoming calls.

A loop start trunk generally has a literal phone number assigned thereto. A DID trunk does not have a particular phone number assigned thereto. Typically, a group of telephone numbers is designated as the numbers reserved for the customer's incoming calls on DID trunks. DID trunks provide a number of physical paths to link the central switch with the terminal equipment. There may be, for instance, one hundred numbers associated with a DID block, as defined by the last three numbers of a seven digit telephone number, which may be serviced by, for example, eight DID trunks. Any call which comes in to any of the hundred numbers is routed to an available DID trunk. Typically, the central switch will transmit less than the seven numbers which the caller dials, however, this can be changed upon request.

Trunk interface module 16 is capable of responding to seven or more digits in a dialed number and temporarily storing them, block 52. Interface module 16 attempts to make contact with VRU 18, block 54. If VRU 18 is busy, a busy tone is generated and the call terminated, block 56. If VRU 18 is not busy, the loop port associated with the DID trunk is closed, the digits stored in interface module 16 are down loaded into VRU 18, block 58, digitized in the VRU, block 60, and passed as a signal to computer 22, block 62.

Computer 22 verifies that the dialed number-1/identification number is valid, block 64, and, if it is, a path is opened between computer 22 and the caller using dialed number-1. The caller is prompted to enter appropriate codes to transmit instructions and messages to the computer, block 66. The message from the caller is processed, block 68, and transmitted through transmitter 26 to the subscriber's receiver.

If the dialed number-1/identification number is not valid, VRU 18 is instructed to ask the caller to manually enter an identification number, block 70. The caller, in the preferred embodiment, gets two opportunities to enter a valid identification number. If the identification number is still not valid, block 72, the call is terminated, block 74. In the event that the caller enters a valid identification number, the primary loop is entered at block 66, and the port on interface module 16 makes connection between the caller and computer 22.

Figure 4:
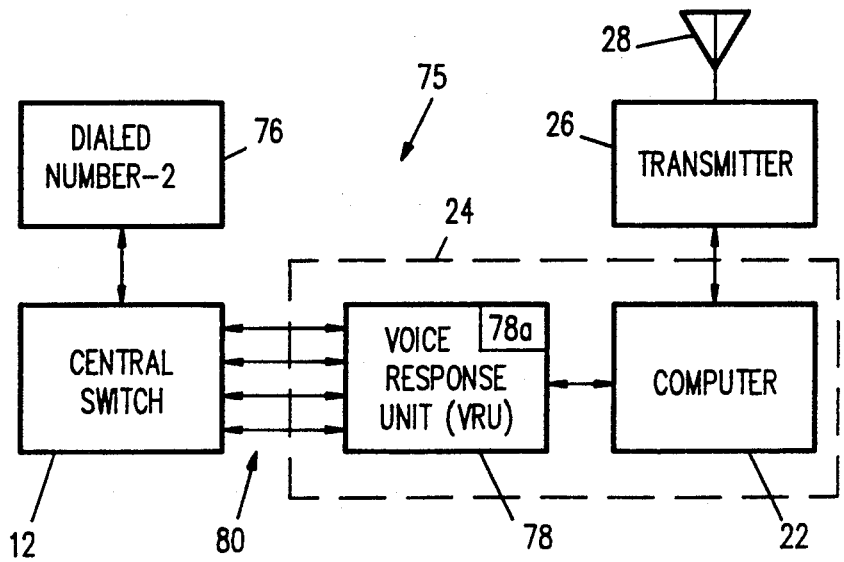
FIG. 4 is a block diagram of a subscriber portion of the system.

Referring now to FIG. 4, a subscriber system maintenance portion 75 of central clearing house 24 is depicted, along with transmitter 26 and central switch 12. In this portion of the system, a subscriber is provided with a number, such as dialed number-2, block 76, which is used to access computer 22. The subscriber calls the clearing house using dialed number-2, which is connected to central switch 12 by a general purpose line 31. The call is processed by central switch 12, and enters VRU 18, over loop start trunks, or possibly over DID trunks, which are represented by the lines at 80.

VRU 18 input ports 18a include a second plurality of input ports which are connected to loop start trunks 80. Receiver 18a is constructed to acknowledge incoming calls, and will provide one set of voice prompts if a call comes in through interface module 16, and another set of voice prompts only if a call comes in over loop start trunks 80.

Once the connection is made between VRU 18 and a subscriber or caller over loop start trunks 20, the caller is first instructed to enter a system maintenance identification number, which may be the unique identification number assigned to the subscriber's receiver, or may be another identification number. Once the correct identification number has been verified by computer 22, the subscriber is prompted by VRU 18 to proceed with the system maintenance routine, which may includes requests for retransmission of messages, entry of special codes to initiate messages, etc.

The provision of this portion of the pager system allows subscribers and callers to have separate access to the system and also provides security for subscribers in that the separate subscriber portion of the system is not as likely to be compromised because only subscribers will have access to it.

The trunk interface module allows a caller to dial a single seven digit number, reach a central switch and ultimately send a message to a paging receiver, without the necessity of entering a unique identification number for the particular receiver, having already dialed a number common to all receivers, which essentially works on a rotary system at central switch 12. The subscriber portion of the pager system provides security for system subscribers.

Although a preferred embodiment of the invention has been disclosed, it should be appreciated that modifications and variations may be made thereto without departing from the scope of the invention as defined in the appended claims.

What I claim is:

1. A pager access system for selectively transmitting messages from callers through a telephone company central switch to a plurality of individually addressed receivers, each of said receivers having a seven digit identification number, said central office switch having, (a) a plurality of general purpose telephone lines adapted for connection to telephone handsets, (b) means for recognizing telephone numbers dialed by handsets connected to the general purpose telephone lines, (c) a plurality of DID (direct inward dial) trunk lines, said DID trunk lines having telephone numbers associated therewith which are identical to the receiver seven digit identification numbers, and (d) a plurality of loop start trunk lines, the pager access system comprising, in combination:

a computer which assembles messages in a specific format for transmission to specific receivers;

a trunk interface module having (a) input ports connected to the DID trunk lines, (b) means operative, when a DID trunk line is activated, for obtaining from the central switch the seven digit called telephone numbers dialed by the handset, which caused the line to be activated, (c) output ports, (d) output lines, and (e) means operative when an input line is activated for activating an output line and for generating on said output line a dual-tone, multifrequency (DTMF) signal representing the called number;

a voice response unit (VRU) for generating voice prompts, accepting said DTMF input signals, and for sending signals to said computer in response to said DTMF signals, said VRU having (a) plural input ports, (b) means connecting a first plurality of said input ports to the output ports of said trunk interface module, (c) means connecting a second plurality of said input ports to said loop start trunk lines, (d) means activated when an input port is activated for generating a series of voice prompts and for accepting a series of DTMF signals representing commands, said voice prompts being given only if the associated DTMF command is not received, the first voice prompt asking for the identification number of the receiver which the caller desires to contact;

whereby said VRU transmits one set of prompts to a caller connected thereto through said trunk interface module and another set of prompts to a subscriber connected thereto through said loop start trunk lines, whereby a particular receiver can be contacted either by calling a DID telephone number or by calling a telephone number which connects to a loop start trunk line, wherein the caller is required to enter the receiver's identification number when connected to the VRU through a loop start trunk line.

2. A direct pager access system with full number dialing for use with: (a) a central telephone switching system having DID trunks extending to a paging system central clearing house, including a clearing house computer, and (b) portable receivers with unique identification numbers which identifications numbers are contained in a data base in the computer in the central clearing house, said pager access system comprising:

a trunk interface module having message recognition means constructed and arranged to recognize the unique receiver identification numbers associated with each receiver; and a voice response unit for providing a connection between said trunk interface module and the clearing house computer.

3. The pager system of claim 2 wherein said message recognition means includes means for recognizing at least seven completely random digits which comprise the unique receiver identification numbers.

4. A direct pager access system for use with: (a) a central telephone switching system having DID trunks extending to a paging system central clearing house, including a clearing house computer, and (b) portable receivers with unique identification numbers which identifications numbers are contained in a data base in the computer in the central clearing house, said pager access system comprising:

a relative-digit-independent trunk interface module for recognizing and relaying to the clearing house computer a set of at least seven digits comprising the unique receiver identification number wherein the values of the digits in the identification number are completely random.

5. A direct pager access system with full number dialing for use by a caller and by a subscriber, with a central telephone switching system having DID trunks and loop start trunks extending to a paging system central clearing house, including a clearing house computer, and portable receivers with unique identification numbers which identifications numbers are contained in a data base in the computer in the central clearing house, comprising:

a trunk interface module having message recognition means constructed and arranged to recognize the unique receiver identification numbers associated with each receiver when dialed by a caller who is transmitting a message to a subscriber over the DID trunks;

a direct dialed-number receiver for responding to a dialed number dialed by a subscriber for account management; and a voice response unit for providing a connection between the central telephone switching system, said trunk interface module, said direct dialed-number receiver and the clearing house computer, wherein said voice response unit transmits one set of prompts to a caller connected thereto through said trunk interface module and another set of prompts to a subscriber connected thereto through the loop start trunks.

6. The pager system of claim 5 wherein said message recognition means includes means for recognizing at least seven completely random digits which comprise the unique receiver identification numbers.

7. A method of operating a paging system which includes a receiver wherein the receiver has a discreet, unique identification number having at least seven randomly assigned digits therein, comprising:

dialing, on a telephone, the unique, minimally seven digit, identification number for a select receiver;

processing the unique identification number through a telephone company central switching facility;

transmitting the processed identification number from the central switch through one of several DID trunk lines to a paging system central clearing house;

relaying the identification number through a relative-digit-independent trunk interface module to a central clearing house computer; and comparing the received identification number to account numbers stored in the computer, and if the identification number and an account number match, providing a data/voice connection between the central switch and the computer.

8. A method of operating a paging system which includes a receiver wherein the receiver has a discreet, unique identification number having at least seven randomly assigned digits therein, wherein the system will be accessed by subscribers for system maintenance and by callers desiring to transmit messages to subscribers, comprising:

for a caller, dialing, on a telephone, the unique, minimally seven digit, identification number for a select receiver;

processing the unique identification number through a telephone company central switching facility;

transmitting the processed identification number from the central switch through one of several DID trunk lines to a paging system central clearing house;

relaying the identification number through a relative-digit-independent trunk interface module to a central clearing house computer;

comparing the received identification number to account numbers stored in the computer, and if the identification number and an account number match, providing a data/voice connection between the central switch and the computer;

prompting the caller with a first set of voice prompts to enter appropriate codes to send a message to a subscriber associated with the unique identification number; and for a subscriber, dialing, on a telephone, a number for accessing the central clearing house, prompting subscribers to enter their unique, minimally seven digit, system maintenance identification number;

transmitting the identification number to a computer in the central clearing house;

comparing the received identification number to account numbers stored in the computer, and if the identification number and an account number match, providing a data/voice connection between the central switch and the computer; and prompting the subscriber with a second set of voice prompts to enter appropriate codes for system management.

* * * * *